Patented Feb. 12, 1946

2,394,584

UNITED STATES PATENT OFFICE 2,394,584

THIOCYANO ALIPHATIC CARBOXYLIC ACID ESTERS OF HYDROXYDIHYDRONORDICYCLOPENTADIENE

Herman A. Bruson, Philadelphia, Pa., assignor, by mesne assignments, to The Resinous Products & Chemical Company, Philadelphia, Pa., a corporation of Delaware No Drawing. Application September 12, 1944, Serial No. 553,800

4 Claims. (Cl. 260—454)

This invention relates to new esters of thiocyano aliphatic carboxylic acids and of hydroxydihydronordicyclopentadiene. These esters have the general formula $$C_{10}H_{13}OCOA\text{—}SCN$$

wherein $C_{10}H_{13}$ is the dihydronordicyclopentadiene group and A is an alkylene radical.

This application is a continuation-in-part of my copending application Serial No. 476,639, filed February 20, 1943, wherein there is broadly disclosed the reaction of carboxylic acids with polycyclopentadienes having two double bonds per molecule in the presence of acidic condensing agents. In this reaction, the acid is added across the double bond of the endomethylene cycle with simultaneous rearrangement of this cycle to an endoethylene cyclopentano system having a cyclopenteno group attached thereto. The new ring system which is thus obtained is herein termed "norpolycyclopentadiene" generically and "nordicyclopentadiene" specifically for the system derived from dicyclopentadiene. The alcohols which correspond are termed "hydroxydihydronorpolycyclopentadiene" and "hydroxydihydronordicyclopentadiene" respectively.

The new compounds of this invention are readily prepared by adding together with rearrangement a halogenated aliphatic carboxylic acid and dicyclopentadiene, preferably in the presence of an acidic condensing agent, to form an ester of hydroxydihydronordicyclopentadiene, and replacing the halogen atom thereof with a thiocyano radical. Alternatively, the new esters of this invention are prepared by esterifying hydroxydihydronordicyclopentadiene with a halo carboxylic acid and then replacing the halogen of the resulting ester with a thiocyanate group.

According to the reaction involving both addition and rearrangement dicyclopentadiene reacts with a halogenated fatty acid, XACOOH, where X represents chlorine or bromine, and the resulting product is converted to a thiocyanate as follows:

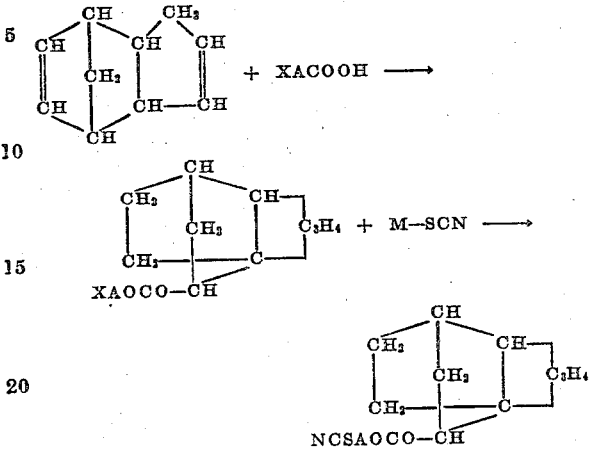

wherein $C_3H_4$ represents a propenylene group which conjointly with the adjoining carbon atoms forms a cyclopenteno group.

As an acidic condensing agent in the above addition-rearrangement reaction, there may be used such catalysts as boron trifluoride and its coordination complexes with oxygenated compounds such as ethers, esters, carboxylic acids, ketones, aldehydes, alcohols, water, etc., sulfuric acid, acid esters of sulfuric acid such as ethyl acid sulfate, sulfonic acids such as toluene sulfonic acid or butyl sulfonic acid, other strong acids, the usual amphoteric metal halides such as aluminum chloride and the like. The amount of acidic condensing agent may vary widely from a small percent of the weight of the dicyclopentadiene to a molecular equivalent or more.

The reaction may be performed with or without an inert solvent, such as ethylene dichloride or dioxane. It may be performed at temperatures from room temperature up to 150° C. and more, although the range of 50° C. to about 140° C. is preferred.

The conversion of haloester to thiocyano ester may be done according to conventional procedures. For example, the haloester may be taken up in an organic solvent with a salt of thiocyanic acid, such as sodium, potassium, calcium, barium, ammonium, or lead thiocyanates, and the mixture heated and stirred. The halogen salt, which is formed by metathesis, is readily separated from the reaction product and the thiocyano ester worked up by such methods as treatment with charcoal, solvent extraction, distillation, etc.

In the alternative procedure mentioned above, dicyclopentadiene is hydrated in the presence of sulfuric acid to yield hydroxydihydronordicyclopentadiene, as discribed in copending application Serial No. 476,645, filed February 20, 1943. This alcohol is then esterified with a haloaliphatic carboxylic acid to form the ester, which in turn is converted to the thiocyanate as above.

As suitable haloaliphatic acids there may be mentioned chloroacetic acid, bromoacetic acid, α- or β-chloropropionic acids, α- or β-bromopropionic acids, α- or β-chloro- or bromobutyric acids, α-chloro- or bromo-isobutyric acids, and other chloro- and bromo-derivatives of aliphatic carboxylic or fatty acids. Of these, the acids having two to eight carbon atoms form a preferred class.

The new thiocyano aliphatic carboxylic acid esters of hydroxydihydronordicyclopentadiene are generally liquids and have a high degree of solubility in hydrocarbon solvents. The esters of acids of one to four carbon atoms are particularly valuable as toxicants for insecticides.

They may be used in lubricating oil for imparting increased resistance to wear, preventing corrosion, and stabilizing the oils.

The following examples illustrate this invention:

*Example 1*

(a) A mixture of 264 parts of dicyclopentadiene and 800 parts of aqueous 25% sulfuric acid was stirred rapidly and heated under a reflux condenser at 104–107° C. for 4½ hours. The aqueous sulfuric acid layer was then separated and the oil layer washed successively with hot water, dilute soda solution, and finally again with hot water. The oil was dried and distilled in vacuo at 6 mm. absolute pressure of mercury. The product which distilled over between 105° and 115° C./6 mm. was hydroxydihydronordicyclopentadiene. It was a viscid colorless oil. The yield was 250 parts or 83.4% of theory.

A mixture of 150 grams of this alcohol, 95 grams of chloroacetic acid, 200 grams of benzene and 1 gram of 40% sulfuric acid was boiled under a reflux condenser attached to a water separator until water ceased coming over. This required about two hours. The product was cooled, washed with water, dried, and distilled in vacuo to yield 207 grams of the chloroacetate of hydroxydihydronordicyclopentadiene as a colorless liquid boiling at 118–120° C./0.5 mm.

(b) A mixture of 132 grams of dicyclopentadiene, 132 grams of chloroacetic acid and 5 grams of 40% sulfuric acid was stirred for 12 hours at 95° C. The product was washed with dilute soda solution and then with water, dried, and distilled in vacuo to give a 90% yield of the choloracetate of hydroxydihydronordicyclopentadiene having the following constants:

Boiling point, 154–156° C./10 mm.; $n_D^{25}$ 1.5111; $d_4^{25}$ 1.1916.

(c) Thereupon 205 grams of the chloroacetate of hydroxydihydronordicyclopentadiene as prepared in (a) and in (b) above, 200 grams of ethanol (95%), and 81 grams of sodium thiocyanate was boiled under reflux for 12–15 hours. The product was cooled, washed thoroughly with water, and the oil distilled in vacuo. The resulting thiocyanoacetate of hydroxydihydronordicyclopentadiene distilled over at 165–168° C./0.5 mm. as a faintly yellow liquid having a faint not unpleasant odor and having the probable formula

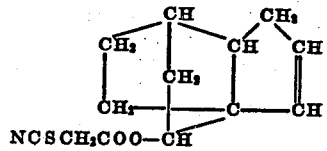

A 5% solution in deodorized kerosene when tested as an insecticide against flies gave a 100% knockdown and 100% kill. It may also be used against mosquitoes and other insect pests.

*Example 2*

To a stirred mixture of 105 grams of β-chloropropionic acid and 5 grams of 40% sulfuric acid, there was gradually added 139 grams of dicyclopentadiene at 60–75° C. during the course of fifteen minutes. The mixture was then heated at 95° C. for 4 hours, and after being cooled, washed with water and soda solution. The product was then dried in vacuo. The oil obtained amounted to 224 grams and consisted essentially of the β-chloropropionate of hydroxydihydronordicyclopentadiene. Upon distillation in vacuo the pure compound distills over at 130–135° C./mm. as a colorless oil.

A mixture of 200 grams of ethanol, 65 grams of sodium thiocyanate and 157 grams of the above β-chloropropionate of hydroxydihydronordicyclopentadiene was boiled under reflux for 17 hours. The product was washed thoroughly with water and dried in vacuo to yield 168 grams of crude β-thiocyanopropionate of hydroxydihydronordicyclopentadiene as an amber-colored oil having the probable formula

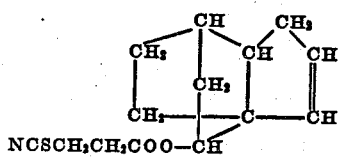

Upon distillation in vacuo it boiled at 167–174° C./0.5 mm. and formed a viscous pale yellow oil.

It is particularly useful in fly sprays alone or with pyrethrum or rotenone as an insecticide.

*Example 3*

A mixture of 1 mol of the α-chloroisobutyrate of hydroxydihydronordicyclopentadiene is boiled in alcohol for eight hours with 1.1 moles of potassium thiocyanate and worked up as in Example 2.

The crude α-thiocyanoisobutyric acid ester of hydroxydihydronordicyclopentadiene is obtained as an amber-colored oil which can be used as a toxicant for the preparation of insecticides.

I claim:

1. As a new compound, a thiocyano-aliphatic carboxylic acid ester of hydroxydihydronordicyclopentadiene.

2. As a new compound, the thiocyano acetic acid ester of hydroxydihydronordicyclopentadiene.

3. As a new compound, the β-thiocyanopropionic acid ester of hydroxydihydronordicyclopentadiene.

4. As a new compound, the α-thiocyano isobutyric acid ester of hydroxydihydronordicyclopentadiene.

HERMAN A. BRUSON.